United States Patent
Jung et al.

(10) Patent No.: US 12,291,132 B2
(45) Date of Patent: May 6, 2025

(54) DEVICE FOR ADJUSTING SEAT OF VEHICLE

(71) Applicants: Hyundai Motor Company, Seoul (KR); Kia Corporation, Seoul (KR); DAS CO., LTD, Gyeongsangbuk-do (KR); Hyundai Transys Inc., Chungcheongnam-do (KR)

(72) Inventors: Ho Suk Jung, Gyeonggi-do (KR); Sang Ho Kim, Incheon (KR); Jun Hwan Lee, Seoul (KR); Mu Young Kim, Gyeonggi-do (KR); Sang Soo Lee, Gyeonggi-do (KR); Sang Do Park, Gyeonggi-do (KR); Chan Ho Jung, Gyeonggi-do (KR); Dong Man Lee, Gyeonggi-do (KR); Woo Ryang Kim, Gyeonggi-do (KR); Jae Hwa Choi, Gyeonggi-do (KR); Jong Beom Na, Gyeonggi-do (KR); Cheol Hwan Yoon, Gyeonggi-do (KR); Hae Dong Kwak, Gyeonggi-do (KR); Jun Sik Hwang, Gyeonggi-do (KR); Jung Bin Lee, Gyeonggi-do (KR)

(73) Assignees: Hyundai Motor Company, Seoul (KR); Kia Corporation, Seoul (KR); DAS CO., LTD, Gyeongsangbuk-do (KR); Hyundai Transys Inc., Chungcheongnam-Do (KR)

( * ) Notice: Subject to any disclaimer, the term of this patent is extended or adjusted under 35 U.S.C. 154(b) by 374 days.

(21) Appl. No.: 17/977,363

(22) Filed: Oct. 31, 2022

(65) Prior Publication Data
US 2023/0049867 A1    Feb. 16, 2023

(30) Foreign Application Priority Data

Nov. 4, 2021 (KR) .......................... 10-2021-0150164

(51) Int. Cl.
*B60N 2/12* (2006.01)
*B60N 2/02* (2006.01)

(52) U.S. Cl.
CPC ........... *B60N 2/12* (2013.01); *B60N 2/02246* (2023.08); *B60N 2/02253* (2023.08)

(58) Field of Classification Search
CPC .. B60N 2/12; B60N 2/02253; B60N 2/02246; B60N 2/1685; B60N 2/1695; B60N 2/18; B60N 2/20
See application file for complete search history.

(56) References Cited

U.S. PATENT DOCUMENTS

2006/0055214 A1* 3/2006 Serber ................ B60N 2/42763
297/216.1
2014/0300160 A1* 10/2014 Shigematsu ......... B60N 2/0296
297/463.1

(Continued)

*Primary Examiner* — Mark R Wendell
(74) *Attorney, Agent, or Firm* — Fox Rothschild LLP

(57) ABSTRACT

Provided is a device for adjusting a seat of a vehicle. The device integrates a fold-and-dive function in addition to a walk-in function of a seat and also enables a forward or backward sliding movement function of the seat to be linked with other functions, so that the walk-in operation that tilts second-row seats or third-row seats to a forward direction for securing an aisle for a passenger to get in or out of the vehicle may be easily performed. Further, the walk-in operation state may be robustly maintained since the seat is robustly fixed after the walk-in operation is performed, and the device contributing to a standardization in which various functions in addition to the walk-in function are integrated with each other and contributing to functional expandability may be provided.

20 Claims, 10 Drawing Sheets

(56) References Cited

U.S. PATENT DOCUMENTS

| | | | |
|---|---|---|---|
| 2016/0159256 A1* | 6/2016 | Szlag | B60N 2/12 297/341 |
| 2020/0180474 A1* | 6/2020 | Moon | B60N 2/3093 |
| 2022/0227264 A1* | 7/2022 | Mochizuki | B60N 2/146 |
| 2022/0332224 A1* | 10/2022 | Lee | B60N 2/2358 |

* cited by examiner

DEVICE FOR ADJUSTING SEAT OF VEHICLE

CROSS REFERENCE TO RELATED APPLICATION

The present application claims under 35 U.S.C. § 119 (a) the benefit of Korean Patent Application No. 10-2021-0150164, filed Nov. 4, 2021, the entire contents of which is incorporated herein for all purposes by this reference.

TECHNICAL FIELD

The present disclosure relates to a device for adjusting a seat of a vehicle. More particularly, the present disclosure relates to a device for adjusting a seat of a vehicle, in which the device facilitates a walk-in operation of second-row seats or third-row seats in order to secure an aisle for passengers to get in or out of the vehicle.

BACKGROUND

Generally, a seat mounted inside a passenger vehicle includes first-row seats (front seat) and second-row seats (rear seat). In addition to the first-row seats and the second-row seats, third-row seats or more seats are mounted inside a van or a sport utility vehicle, and the seats are mounted in various arrangements.

A seat including a walk-in function for securing an aisle for a passenger to get in or out of the vehicle is adapted in the second-row seats or the third-row seats of the vehicle seats.

For example, when two-row or more rows of seats are mounted inside a two door vehicle, a conventional walk-in function for securing an aisle for a passenger to get in or out of the second-row seats of the vehicle may be realized by performing at least two steps of operations in which a reclining operation that reclines a seatback of the first-row seats to a forward direction and a moving operation that slidably moves entire of the first-row seats to the forward direction are included.

Alternatively, in a four door vehicle in which three-row or more rows of seats are mounted, the conventional walk-in function for securing an aisle for a passenger to get in or out of the second-row seats of the vehicle may be realized by performing at least two steps of operations in which the reclining operation that reclines seatbacks of the second-row seats to the forward direction and a moving operation that slidably moves entire of the second-row seats to the forward direction are included.

However, when the walk-in function is performed, there is an inconvenience that a user has to manually operate at least two steps of operations that include the reclining operation that reclines the seatback to the forward direction and the moving operation that slidably moves entire of the seat.

In order to resolve the inconvenience, a walk-in mechanism that tilts entire of the seat including a seat cushion and a seatback to the forward direction has been applied.

However, in the conventional walk-in mechanism that tilts the entire of the seat to the forward direction, there is a problem that a robustness of the seat is low since the seat does not stably fix after the walk-in operation is performed. Further, the conventional walk-in mechanism is difficult to perform a standardization for integrating a fold-and-dive function and the like in addition to the walk-in function, and there is another problem that the conventional walk-in mechanism has a limitation in expanding another function that can be linked in addition to the walk-in function.

SUMMARY

The present disclosure has been made keeping in mind the problems occurring in the related art, and an objective of the present disclosure is to provide a device for adjusting a seat of a vehicle, in which the device facilitates a walk-in operation that tilts second-row seats or third-row seats to a forward direction for securing an aisle for a passenger to get in or out of the vehicle and enables a state of the walk-in operation to be robustly maintained by firmly fixing the seat after the walk-in operation is performed.

In addition, another objective of the present disclosure is to integrate a fold-and-dive function in addition to the walk-in function of the seat and to enables a forward and backward sliding movement function and the like function to be linked with each other, thereby contributing to a functional expandability and to a standardization in which various functions in addition to the walk-in function are integrated with each other.

In order to achieve the above objectives of the present disclosure, there is provided a device for adjusting a seat of a vehicle, the device including: a movable rail fastened to a stationary rail and configured to be movable in a forward direction and a backward direction; a base frame mounted on the movable rail; a seat cushion tilting frame connected to a seatback frame; a rear link provided in a structure having a locking protrusion, and the rear link hinge-fastened between a rear end portion of the base frame and a rear end portion of the seat cushion tilting frame and configured to be rotatable in the forward direction and the backward direction; a rear spring mounted on the rear link and configured to exert an elastic restoration force that rotates the rear link in the forward direction; a locking device mounted on the seat cushion tilting frame and configured to lock the rear link such that the rear link maintains a horizontally arranged state or to unlock the rear link such that the rear link is rotated to the forward direction by the elastic restoration force of the rear spring and is lifted vertically; and a front link hinge-fastened between a front end portion of the base frame and a front end portion of the seat cushion tilting frame and configured to be rotatable in the forward direction and the backward direction.

Preferably, the locking protrusion may be formed in a sector gear shape and may be provided on an upper end of a front surface portion of the rear link.

In some embodiment, a slot for uniformly guiding a rotation path of the rear link may be formed on a behind position of the locking protrusion on an upper end portion of the rear link, and a guide pin inserted into the slot may be protrudingly formed on the seat cushion tilting frame.

In some embodiment, the rear spring may be a spiral spring which has an inner end portion fixed to a first spring fixing pin that is formed on an upper end center portion of the rear link and which has an outer end portion fixed to a second spring fixing pin that is formed on a middle portion of the rear link.

Particularly, the locking device may include: a pawl provided in a structure having a locking groove to which the locking protrusion of the rear link is inserted, and the pawl rotatably fastened to the seat cushion tilting frame; a cam provided in a structure capable of being in contact with the pawl, and the cam rotatably fastened to the seat cushion tilting frame so as to rotate the pawl in a locking direction or an unlocking direction; and a cable connected to the cam so as to pull the cam in the unlocking direction.

In some embodiment, an upper end portion of the pawl may be rotatably hinge-fastened to the seat cushion tilting frame, and the pawl may be provided in a structure in which the locking groove is formed on a rear surface portion of the pawl, a pressing protrusion pressed by the cam is formed on a front surface of a lower end portion of the pawl, and a flipping end flipped by the cam is formed on the front surface of the upper end portion of the pawl.

In some embodiment, a lower end portion of the cam may be rotatably hinge-fastened to the seat cushion tilting frame, and the cam may be provided in a structure in which a cable connecting end is formed on an upper end portion of the cam, and an operation end in contact with the pressing protrusion so as to be capable of pressing the pressing protrusion of the pawl or in contact with the flipping end so as to be capable of flipping the flipping end of the pawl is protrudingly formed on a rear surface of the lower end portion of the cam.

In some embodiment, a cover body for protecting the rear link, the pawl, and the cam may be further mounted on the seat cushion tilting frame, and a return spring for returning the cam to an original position of the cam after the cam is rotated may be connected between the cover body and the upper end of the cam.

Preferably, an actuator driven to pull the cable when a switch is turned on may be connected to the cable.

In addition, a front spring configured to exert an elastic restoration force that rotates the front link to the forward direction may be further mounted on the front link.

In some embodiment, the front spring may be a spiral spring which has an inner end portion fixed to a third spring fixing pin that is formed on a lower end portion of the front link and which has an outer end portion fixed to a fourth spring fixing pin that is formed on an upper end portion of the front link.

In addition, a bracket for unlocking the movable rail may be mounted on an inner surface of the rear link, and a linkage lever rotatably in contact with the bracket for unlocking the movable rail may be mounted on a bar for unlocking the movable rail.

In addition, a dive link formed in a hockey stick shape and for diving a front end portion of a seat cushion when a seatback is folded may be connected between the seatback frame and a seat cushion front end frame.

Preferably, a rotating bracket for rotating a hinge-fastening point between the rotating bracket and a rear end portion of the dive link to the forward direction when the seatback frame is folded may be mounted on a side surface portion of the seatback frame.

More preferably, the rotating bracket may include: a fixed plate mounted on the seatback frame and configured to move the hinge-fastening point between the rotating bracket and the dive link to the forward direction when the seatback is folded such that the dive link is pushed in a direction for performing a diving operation; and a hinge connection plate extending and perpendicularly bent downward from the fixed plate.

In addition, a dive supporting link supporting the dive link may be hinge-fastened between a front end portion of the dive link and the front end portion of the seat cushion tilting frame.

According to the above configurations, the present disclosure has the following effects.

First, by the mechanism of tilting the second-row or the third-row seats to the forward direction, the walk-in function for securing an aisle for a passenger to get in or out of the vehicle in which the walk-in function includes the tilting operation that moves the front end portion of the seat cushion downward and moves the rear end portion of the seat cushion upward and the vertically lifting operation of the seatback may be easily realized at one time.

Second, after the walk-in operation is performed, the seatback in which the rear end portion of the seat cushion is moved upward is in the vertically lifted state, so that the aisle where the passenger's feet or shins pass may be widely secured. Therefore, the passenger's getting on and off movement may be stably and conveniently realized.

Third, even if an infant seat is mounted on the seat, the walk-in function including the tilting function that moves the front end portion of the seat cushion downward and moves the rear end portion of the seat cushion upward and the vertically lifting operation of the seatback may be smoothly realized.

Fourth, after the walk-in operation is performed, unless a level of force is applied to the seat to return the seat to an original position, the seat may maintain a robustly fixed state after performing the walk-in operation, so that the passenger may get in or out of the vehicle safely.

Fifth, since the fold-and-dive function and the walk-in function of the seat are integrated with each other and the unlocking operation of the movable rail that is for slidably moving the seat forward and backward is enabled to be linked with other functions at the same time, the seat having a standardization in which various functions in addition to the walk-in function are integrated with each other and the seat having the functional expandability may be provided.

In another embodiment, vehicles are provided that comprise an apparatus as disclosed herein.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Hereinafter, an exemplary embodiment of the present disclosure will be described with reference to accompanying drawings.

Figure 1:
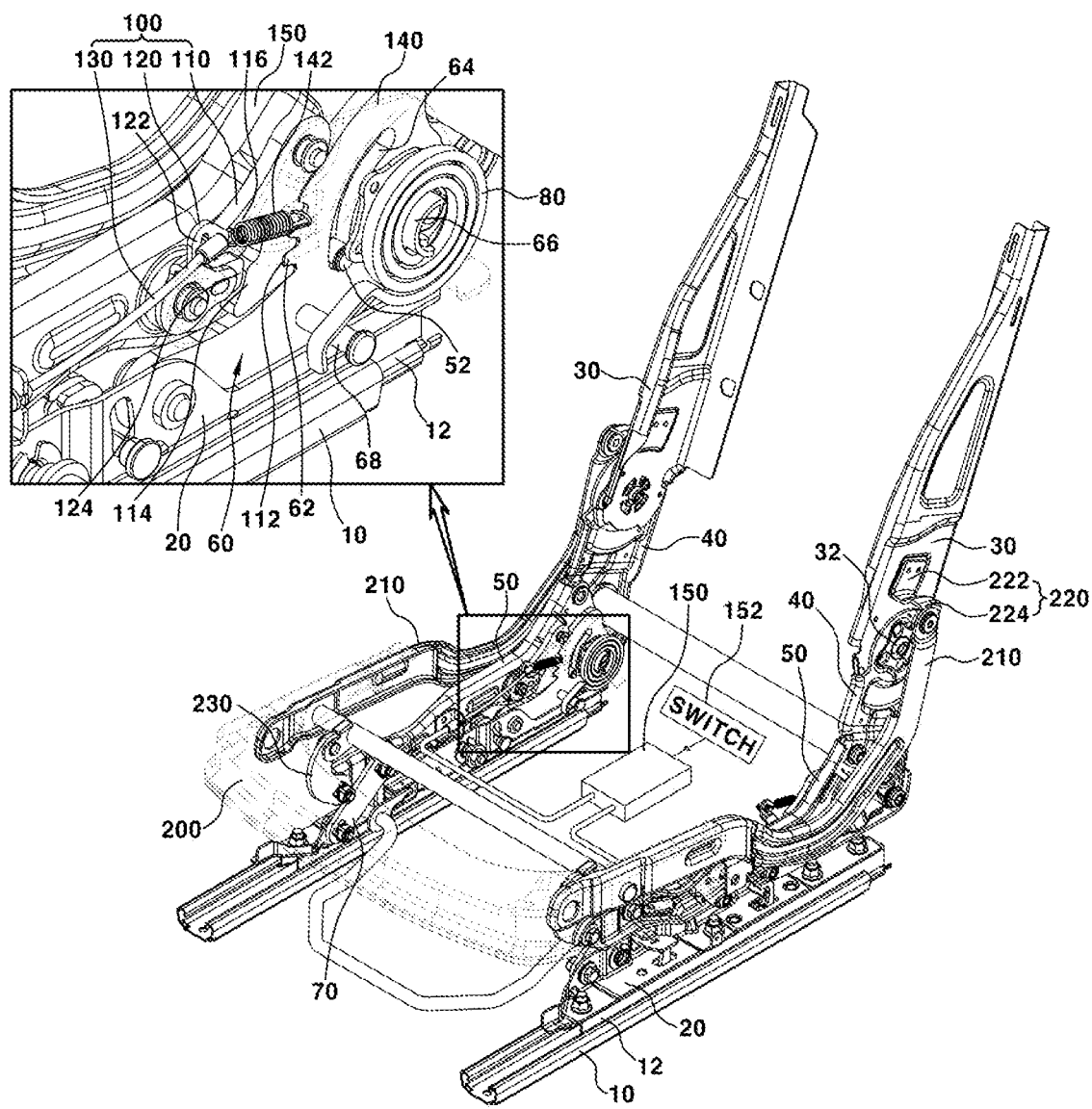
FIG. 1 is a perspective view illustrating a state before a walk-in operation is performed on a device for adjusting a seat of a vehicle of the present disclosure.
Figure 2:
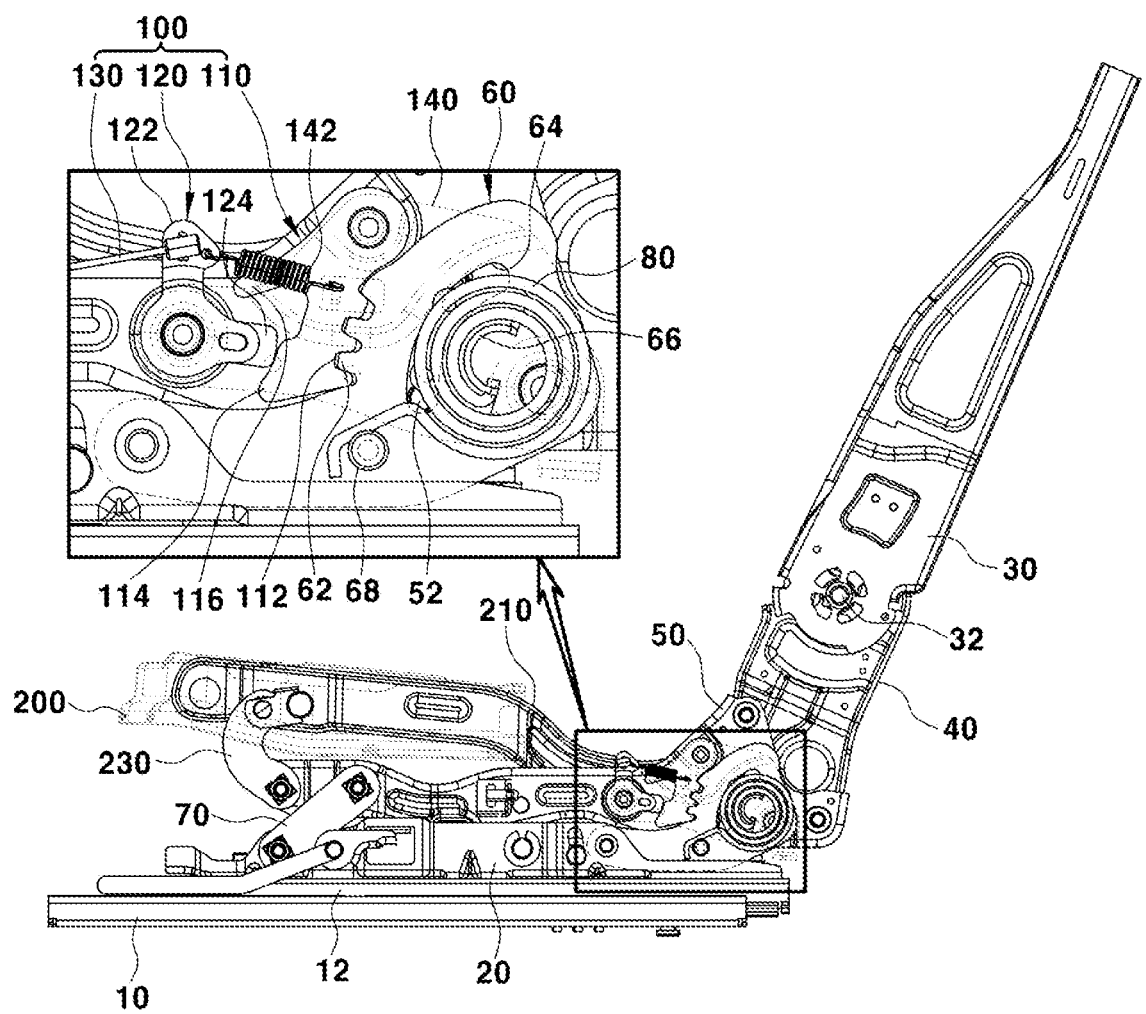
FIG. 2 is a side view illustrating a state before the walk-in operation is performed on the device for adjusting the seat of the vehicle of the present disclosure.
Figure 3:
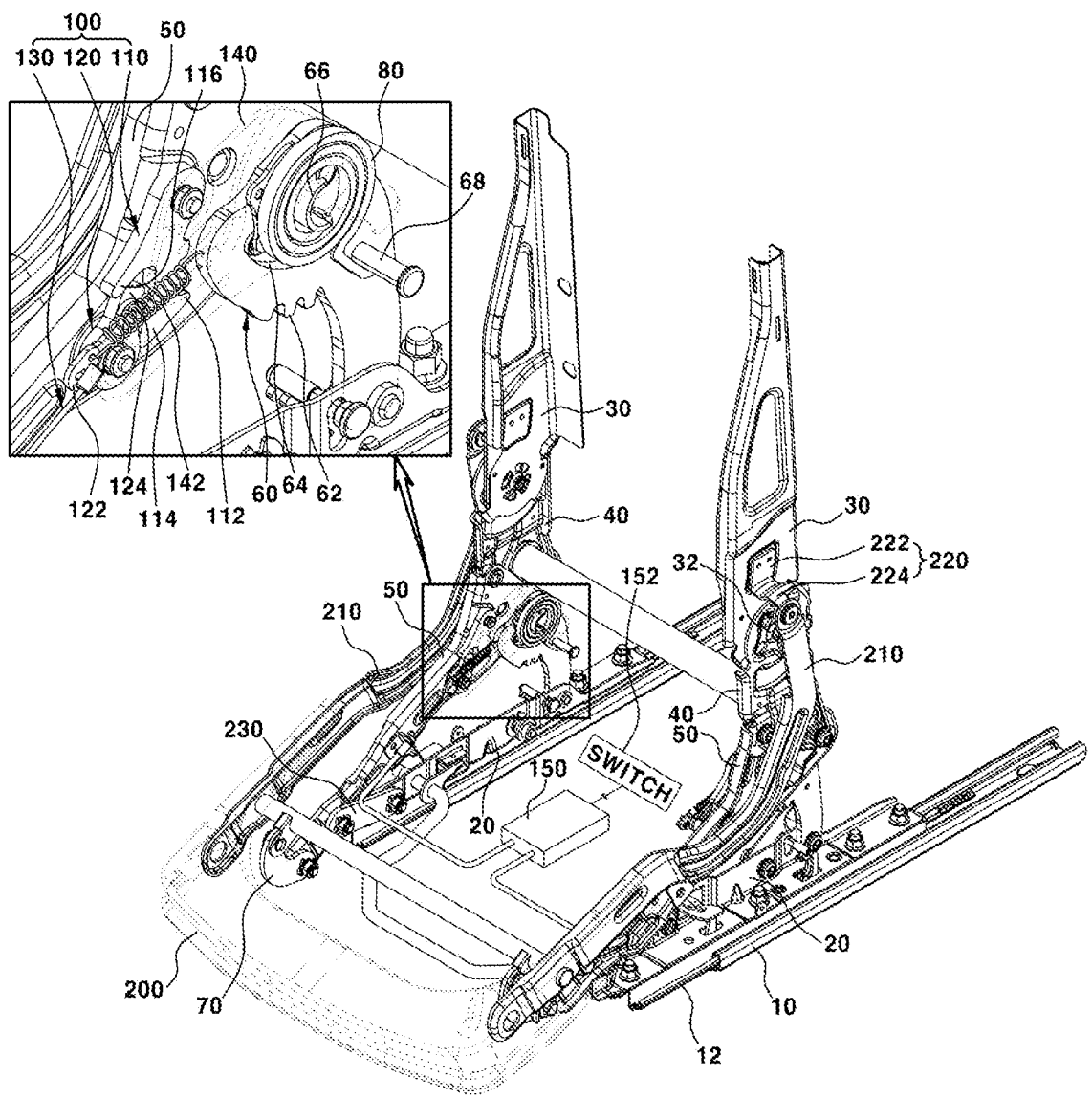
FIG. 3 is a perspective view illustrating a state after the walk-in operation is performed on the device for adjusting the seat of the vehicle of the present disclosure.
Figure 4:
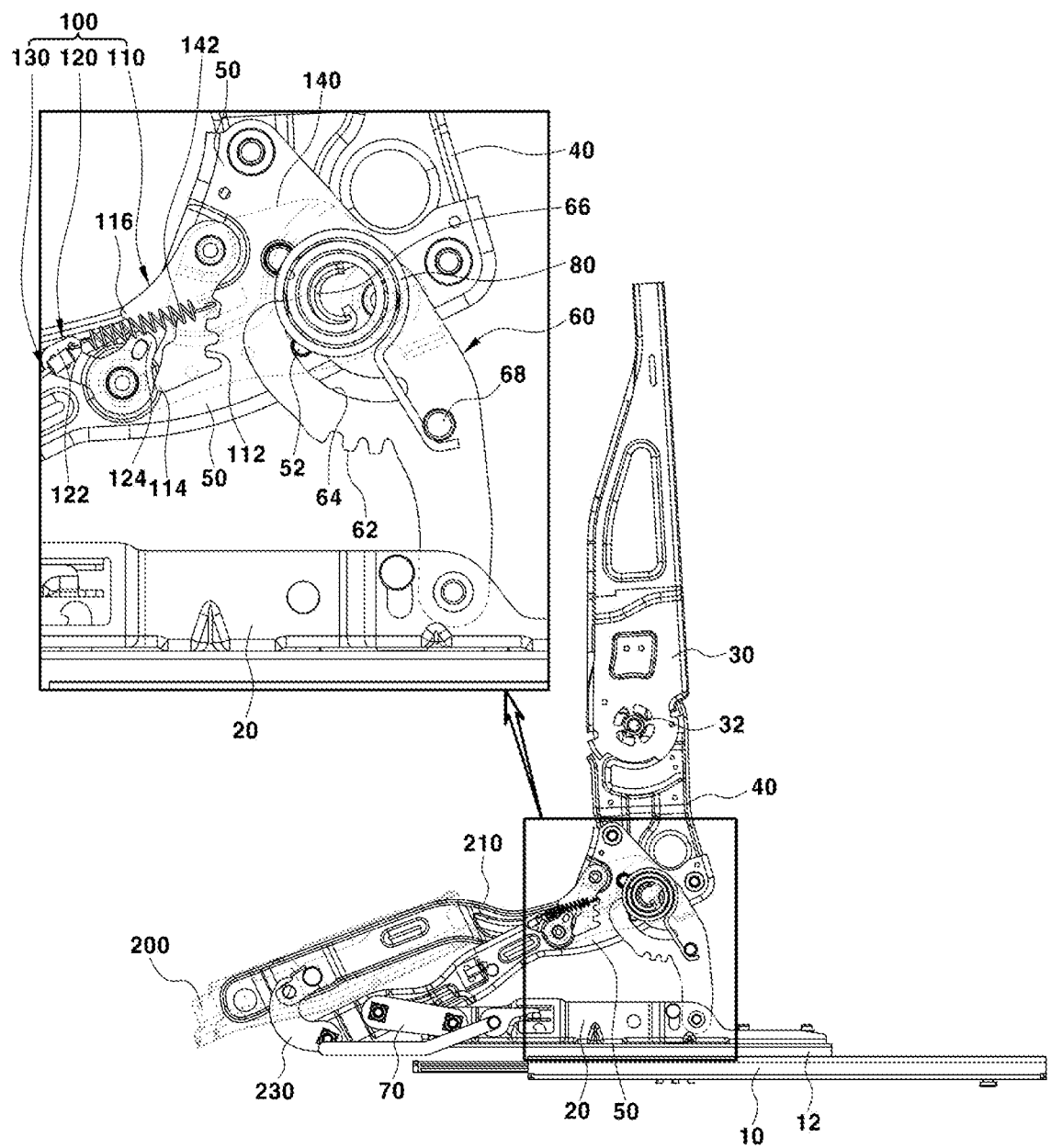
FIG. 4 is a side view illustrating a state after the walk-in operation is performed on the device for adjusting the seat of the vehicle of the present disclosure.

FIGS. 1 and 2 are views illustrating a state before performing a walk-in operation of a device for adjusting a seat of a vehicle of the present disclosure. FIGS. 3 and 4 are views illustrating a state after performing the walk-in operation of the device for adjusting the seat of the vehicle of the present disclosure. Further, reference numeral of 10 indicates a stationary rail.

The stationary rail 10 may be fixed to and mounted on a floor panel (not illustrated) in an interior of a vehicle. Further, a movable rail 12 for slidably moving a seat forward and backward is mounted on the stationary rail 10 and is movable in the forward direction and the backward direction.

In addition, a base frame 20 manufactured in a structure for connecting a seat cushion tilting frame 50, a locking device 100, and the like to each other that will be described later may be mounted on the movable rail 12.

As the base frame 20 is mounted on the movable rail 12 with being in a fixed state, the base frame may be in a movable state in which the base frame 20 can be moved together with the movable rail 12 when the movable rail 12 is moved forward or backward.

At this time, a rear end portion of the seat cushion tilting frame 50 may be integrally connected to a seatback frame 30 by a connecting frame 40.

More particularly, a lower end portion of the seatback frame 30 may be connected to an upper end portion of the connecting frame 40 by a known recliner 32 that is for performing a reclining operation of the seatback frame 30, and a lower end of the connecting frame 40 and the rear end portion of the seat cushion tilting frame 50 may be integrally connected to each other.

The seat cushion tilting frame 50 may be configured to maintain a horizontal state before performing a walk-in operation. Further, after the walk-in operation is performed, the seat cushion tilting frame 50 is configured to perform a tilting operation in which a front end thereof is moved downward and the rear end thereof is moved upward at the same time.

To this end, as a configuration for performing the tilting operation of the seat cushion tilting frame 50, a rear link 60 may be hinge-fastened between a rear end portion of the base frame 20 and the rear end portion of the seat cushion tilting frame 50 such that the rear link 60 is rotatable in the forward direction and the backward direction, and a front link 70 may be hinge-fastened between a front end portion of the base frame 20 and a front end portion of the seat cushion tilting frame 50 such that the front link is 70 rotatable in the forward direction and the backward direction.

In addition, since the rear link 60 is arranged in the horizontal state before performing the walk-in operation and the front link 70 is arranged to be inclined upwardly to the backward direction before performing the walk-in operation, the seat cushion tilting frame 50 may maintain a state before performing the tilting operation.

On the other hand, after performing the walk-in operation, the rear link 60 is rotated in the forward direction and is arranged in a vertically lifted state, and the front link 70 is rotated in the forward direction and is arranged to be inclined upwardly to the forward direction, so that the tilting operation in which the rear end portion of the seat cushion tilting frame 50 is moved upward and the front end of the seat cushion tilting frame 50 is moved downward at the same time may be realized.

Preferably, the rear link 60 may be provided in a structure in which a locking protrusion 62 is formed on an upper end of a front surface of the rear link 60.

In addition, on the upper end portion of the rear link 60, a slot 64 for uniformly guiding a path of a forward or backward rotation of the rear link 60 may be formed in a position behind the locking protrusion 62. Further, a guide pin 52 configured to be inserted into the slot 64 is protrudingly formed on the seat cushion tilting frame 50.

A rear spring 80 configured to exert an elastic restoration force that rotates the rear link 60 to the forward direction may be mounted on the rear link 60, and a spiral spring may be adapted as the rear spring 80.

More specifically, an inner end portion of the rear spring 80 may be fixed to a first spring fixing pin 66 that is formed on a center portion of the upper end of the rear link 60, and an outer end portion of the rear spring 80 may be fixed to a second spring fixing pin 68 that is formed on a middle portion of the rear link 60, so that the elastic restoration force rotating the rear link 60 to the forward direction may be exerted.

On the other hand, the locking device 100 for locking the rear link 60 to maintain the rear link 60 in the horizontally arranged state or for releasing the rear link 60 from the locked state so that the rear link 60 is in the vertically lifted state may be mounted on the seat cushion tilting frame 50.

To this end, the locking device 100 may include a pawl 110 provided in a structure that has a locking groove 112 into which the locking protrusion 62 of the rear link 60 is inserted, the pawl 110 being rotatably fastened to the seat cushion tilting frame 50, a cam 120 provided in a structure capable of being in contact with the pawl 110 and rotatably fastened to the tilting frame 50 such that the pawl 110 is enabled to be rotated in an unlocking direction or in a locking direction, and a cable 130 connected to the cam 120 so as to pull the cam 120 in the unlocking direction.

An upper end portion of the pawl 110 may be rotatably hinge-fastened to the seat cushion tilting frame 50. The locking groove 112 into which the locking protrusion 62 is lockably inserted is formed on a rear surface portion of the pawl 110, and a pressing protrusion 114 pressed by the cam 120 is formed on a lower end portion of a front surface of the pawl 110, and a flipping end 116 flipped by a rotation movement of the cam 120 is formed on an upper end portion of the front surface of the pawl 110.

The lower end portion of the cam 120 may be rotatably hinge-fastened to the seat cushion tilting frame 50. A cable connecting end 122 to which the cable 130 is connected is formed on an upper end portion of the cam 120, and an operation end 124 in contact with the pressing protrusion 114 of the pawl 110 so as to be capable of applying a pressure to the pressing protrusion 114 or in contact with the flipping end 116 of the pawl 110 so as to be capable of flipping the flipping end 116 is protrudingly formed on the lower end portion of the rear surface of the cam 120.

At this time, an actuator 150 driven to pull the cable 130 when a switch 152 is turned on may be connected to the cable 130.

In addition, a cover body 140 for protecting and rotatably supporting the rear link 60, the pawl 110, the cam 120, and the like at the same time may be further mounted on the seat cushion tilting frame 50. Further, a return spring 142 for returning the cam 120 to an original position thereof after the cam 120 is pulled is connected between the cover body 140 and the upper end portion of the cam 120.

Here, an operation flow of the seat walk-in device of the present disclosure configured as described above is as follows.

Referring to FIGS. 1 and 2 that illustrate the state before performing the walk-in operation of the seat, in a state in which the cable 130 is not pulled, the operation end 124 of the cam 120 may press the pressing protrusion 114 of the pawl 110, so that the locking protrusion 62 of the rear link 60 maintains a state in which the locking protrusion 62 is inserted and locked into the locking groove 112 of the pawl 110.

In addition, since the locking protrusion 62 of the rear link 60 is inserted and locked into the locking groove 112 of the pawl 110, the rear link 60 may maintain the horizontally arranged state while being immovably fixed before the walk-in operation is performed.

In addition, the seat cushion tilting frame 50 connected to the rear link 60 may also maintain the horizontally arranged state while being immovably fixed.

At this time, before the walk-in operation is performed, the front link 70 may be arranged to be inclined upwardly toward the backward direction.

Referring to FIGS. 3 and 4 that illustrate a state after performing the walk-in operation of the seat, before the walk-in operation of the seat is performed, when the switch 152 is operated to secure an aisle for passengers in second-row or third-row seats to get in or out of the vehicle, the cable 130 may be pulled by the driving of the actuator 150, and the cable connecting end 122 of the cam 120 may be pulled, so that the cam 120 is rotated in the forward direction.

In addition, as illustrated in FIG. 4, since the cam 120 is rotated to the forward direction and the operation end 124 of the cam 120 flips the flipping end 116 of the pawl 110 upward, the pawl 110 may be rotated in the unlocking direction, so that the locking protrusion 62 of the rear link 60 is in a state in which the locking protrusion 62 is getting out from the locking groove 112 of the pawl 110.

At this time, as the rear link 60 is unlocked, the elastic restoration force of the rear spring 80, which is the elastic restoration force rotating the rear link 60 to the forward direction, may act on the rear link 60.

Therefore, as illustrated in FIG. 4, the rear link 60 may be rotated to the forward direction by the elastic restoration force of the rear spring 80, and may be in the vertically lifted state. At the same time, the rear link 60 is vertically lifted, and pushes the rear end portion of the seat cushion tilting frame 50 upward.

In addition, at the same time when the rear end portion of the seat cushion tilting frame 50 is moved upward, the front link 70 may be rotated to the forward direction and may be arranged to be gently inclined upwardly to the forward direction, so that the front end portion of the seat cushion tilting frame 50 is moved downward.

In this manner, when the tilting operation in which the rear end portion of the seat cushion tilting frame 50 is moved upward and the front end portion of the seat cushion tilting frame 50 is moved downward at the same time is performed, the seatback frame 30 may be also rotated to the forward direction with the same tilting angle.

In other words, since the seatback frame 30 is connected to the rear end portion of the seat cushion tilting frame 50 by the connecting frame 40, the seatback frame 30 may be rotated to the forward direction with the same tilting angle when the tilting operation of the seat cushion tilting frame 50 as described above is performed, and the seatback frame 30 may be in a state of moving to a position where the seatback frame 30 is almost vertically lifted.

As such, when a rear end portion of a seat cushion that has the seat cushion tilting frame 50 as a frame is moved upward, the walk-in operation for securing an aisle for passengers to get in or out of the vehicle, the walk-in operation including the tilting operation for moving a front end portion of the seat cushion downward and the operation for vertically lifting a seatback that has the seatback frame 30 as a frame, may be easily performed simultaneously.

In addition, after the walk-in operation of the seat is performed, the seatback in which the rear end portion of the seatback frame 30 is moved upward may be in the vertically lifted state, so that the aisle where the passenger's feet or shins pass may be widely secured. Further, the passenger's getting on and off operation may be stably and conveniently realized.

In addition, after the walk-in operation of the seat is performed, even if the pulling force of the actuator 150 applied to the cable 130 is released, the seat may maintain the robustly fixed state unless a level of a force for returning the seat to the original position of the seat is applied to the seat (for example, a force stronger than the elastic restoration force of the rear spring 80). Therefore, the passenger may get in or out of the vehicle safely.

In addition, even if an infant seat is mounted on the seat, the walk-in operation as described above may be performed without interference from the infant seat.

Figure 5:
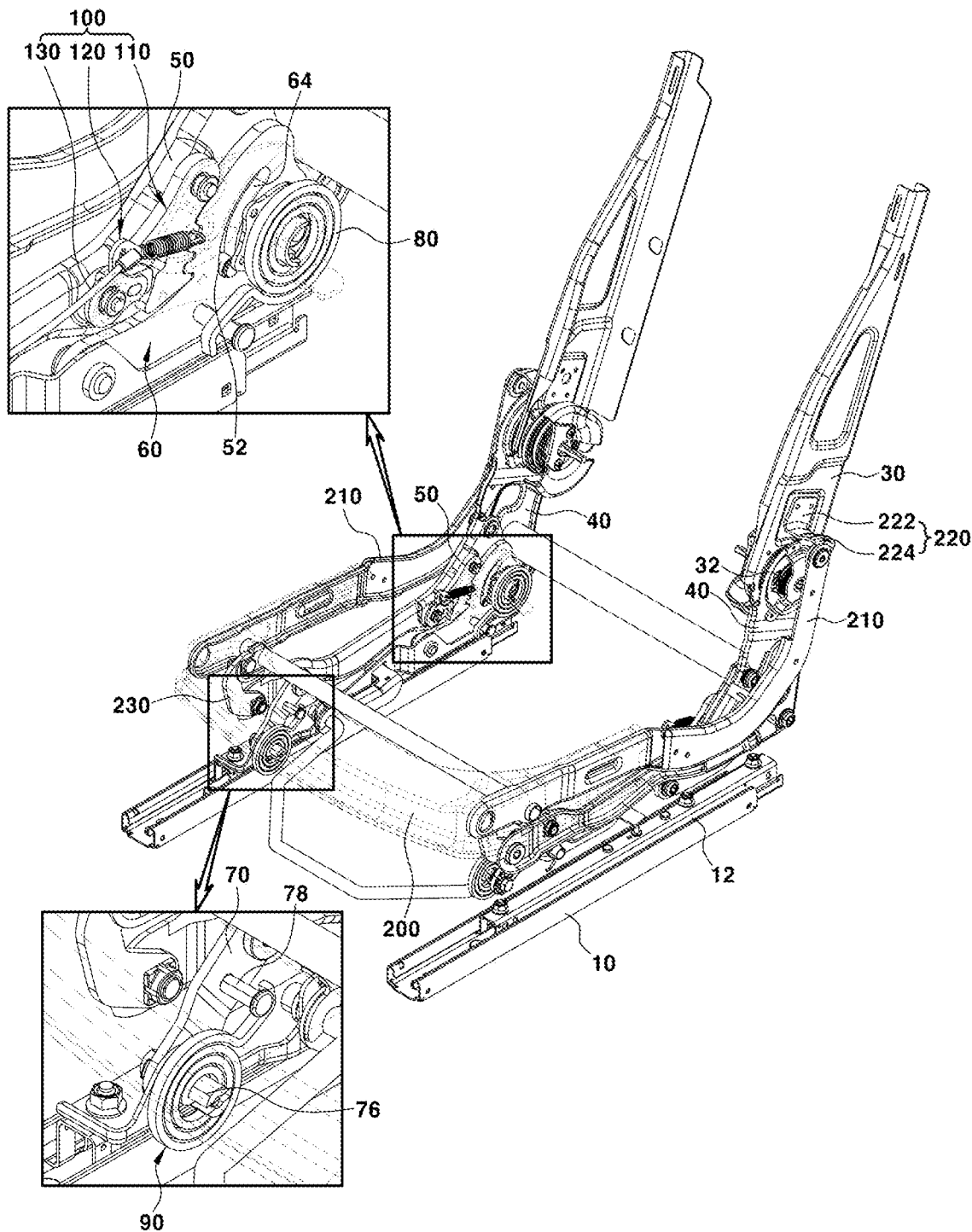
FIG. 5 is a perspective view illustrating a state in which a front spring for performing the walk-in operation is further mounted on the device for adjusting the seat of the vehicle of the present disclosure.
Figure 6:
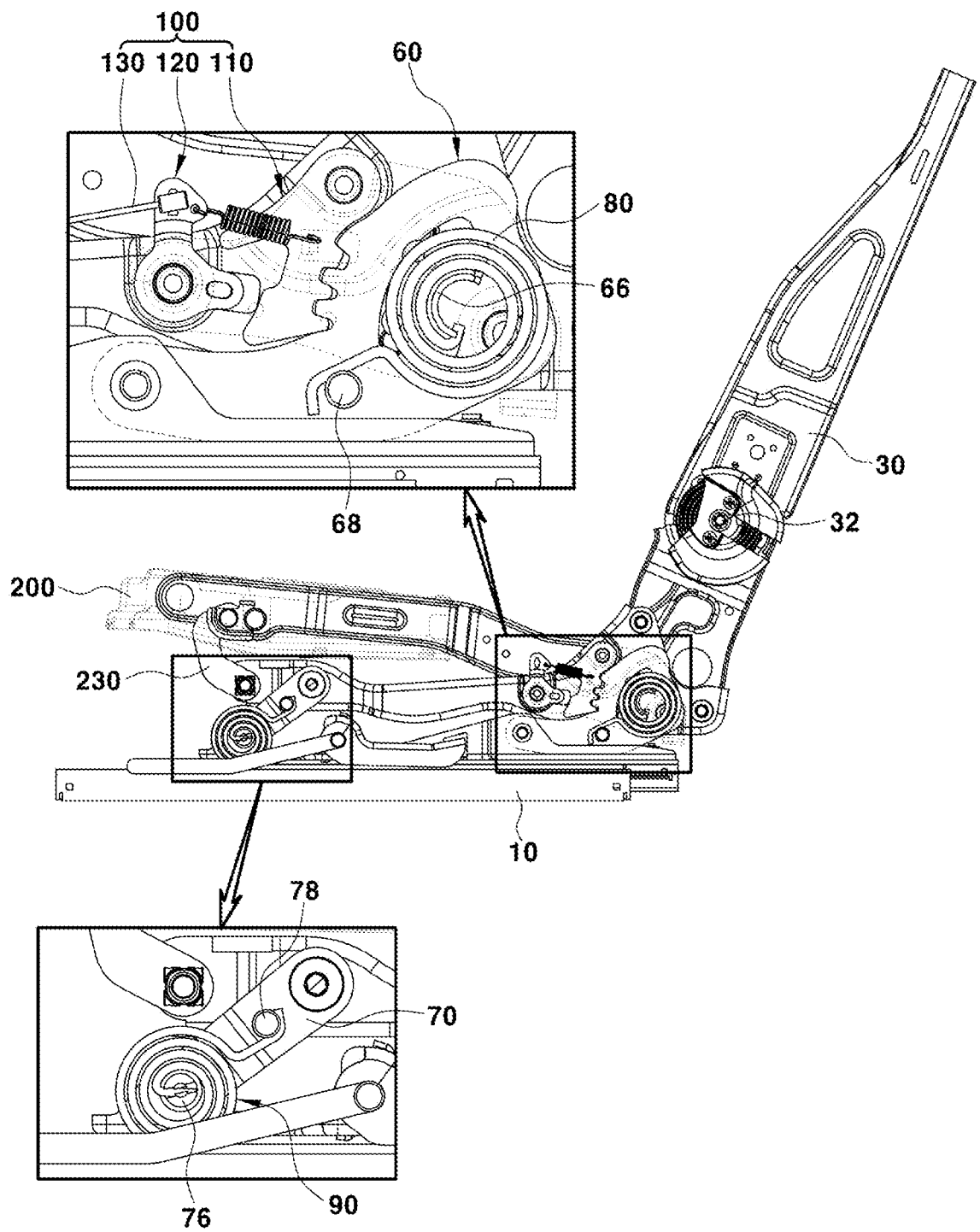
FIG. 6 is a side view illustrating a state in which the front spring is further mounted on the device for adjusting the seat of the vehicle of the present disclosure.

FIGS. 5 and 6 illustrate a state in which a front spring for performing the walk-in operation is further mounted on the device for adjusting the seat of the vehicle of the present disclosure.

As illustrated in FIGS. 5 and 6, a front spring 90 exerting an elastic restoration force rotating the front link 70 to the forward direction may be further included on the front link 70, and a spiral spring may also be adapted as the front spring 90.

Alternatively, on the front link 70, the front spring 90 exerting the elastic restoration force rotating the front link 70 to the forward direction may be mounted alone instead of the rear spring 80.

To this end, an inner end portion of the front spring 90 may be fixed to a third spring fixing pin 76 that is formed on a lower end portion of the front link 70, and an outer end portion of the front spring 90 may be fixed to a fourth spring fixing pin 78 that is formed on an upper end portion of the front link 70, so that the front spring 90 may exert the elastic restoration force rotating the front link 70 to the forward direction.

In addition, when the unlocking state in which the locking protrusion 62 of the rear link 60 is getting out from the locking groove 112 of the pawl 110 is realized while the walk-in operation of the seat is performed, the elastic restoration force of the rear spring 80 rotating the rear link 60 to the forward direction and the elastic restoration force of the front spring 90 rotating the front link 70 to the forward direction may be simultaneously exerted, so that the walk-in operation as described above may be more easily performed.

Alternatively, when the unlocking state in which the locking protrusion 62 of the rear link 60 is getting out from the locking groove 112 of the pawl 110 is realized while the walk-in operation of the seat is performed, the walk-in operation of the seat as described above may be easily performed with only the elastic restoration force of the front spring 90 rotating the front link 70 to the forward direction without the rear spring 80.

In the present disclosure, since a fold-and-dive function in addition to the walk-in function of the seat is integrated with each other and the unlocking operation of the movable rail 12 that is for slidably moving the seat forward and backward is enabled to be linked with other functions at the same time, the seat having a standardization in which various functions in addition to the walk-in function are integrated with each other and the seat having the functional expandability may be provided.

Figure 7:
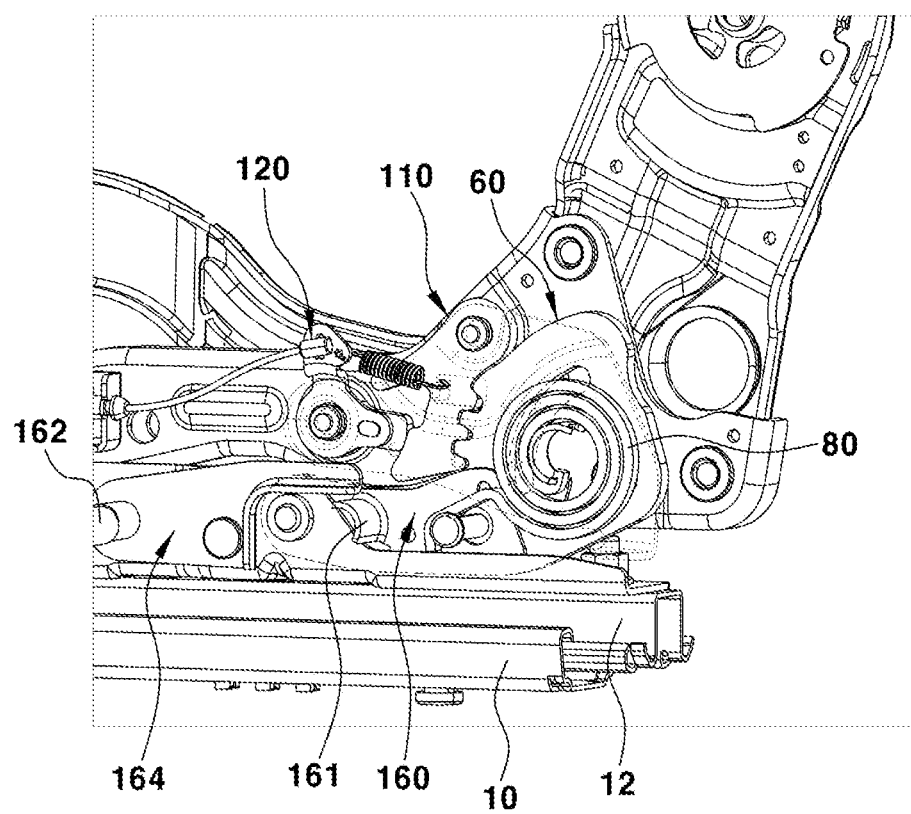
FIG. 7 is a perspective view illustrating a state before operating a bracket for unlocking a movable rail and a linkage lever that are included in the device for adjusting the seat of the vehicle of the present disclosure.
Figure 8:
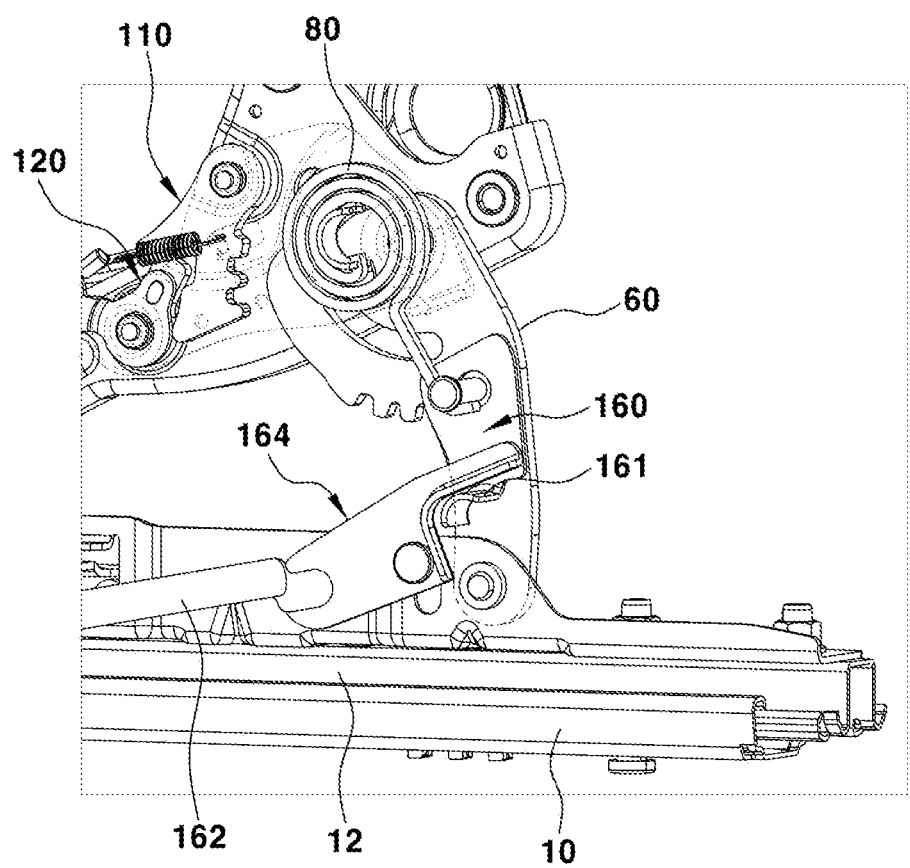
FIG. 8 is a perspective view illustrating a state after operating the bracket for unlocking the movable rail and the linkage lever that are included in the device for adjusting the seat of the vehicle of the present disclosure.

FIGS. 7 and 8 illustrate a state before and after operating a bracket for unlocking the movable rail and a linkage lever that are included in the device for adjusting the seat of the vehicle of the present disclosure.

When entire of the seat is slidably moved to the forward direction after the walk-in operation is performed, the aisle for passenger to get in or out of the vehicle may be more widely secured.

To this end, the unlocking operation of the movable rail 12 which is fastened to the stationary rail 10 and which is slidably movable to the forward and backward directions may be required to be automatically performed after the walk-in operation of the seat is performed.

Accordingly, as a configuration for unlocking the movable rail 12, a bracket 160 for unlocking the movable rail 12 and having a contact end 161 may be mounted on an inner surface of the rear link 60. Further, a linkage lever 164 rotatably in contact with the contact end 161 of the bracket 160 for unlocking the movable rail 12 is integrally mounted on a bar 162 for unlocking the movable rail 12.

At this time, the bar 162 for unlocking the movable rail 12 may be connected to a known locking mechanism of the movable rail 12, and may serve to unlock the movable rail 12 when the bar 162 is rotated upward.

Therefore, when the rear link 60 is rotated to the forward direction by the elastic restoration force of the rear spring 80 and is vertically lifted as described above, and when the contact end 161 of the bracket 160 for unlocking the movable rail 12 pushes the linkage lever 164 upward as illustrated in FIG. 8, the bar 162 for unlocking the movable rail 12 integrally connected to the linkage lever 164 may be rotated upward, so that the movable rail 12 may be automatically released from the locked state.

Accordingly, since the unlocking of the movable rail 12 may be automatically performed without performing an additional operation after the walk-in operation of the seat is performed, the seat may be slidably moved to the forward direction after the walk-in operation of the seat is performed, so that the convenience in getting on and off may be provided to the passenger by securing a wider aisle.

Figure 9:
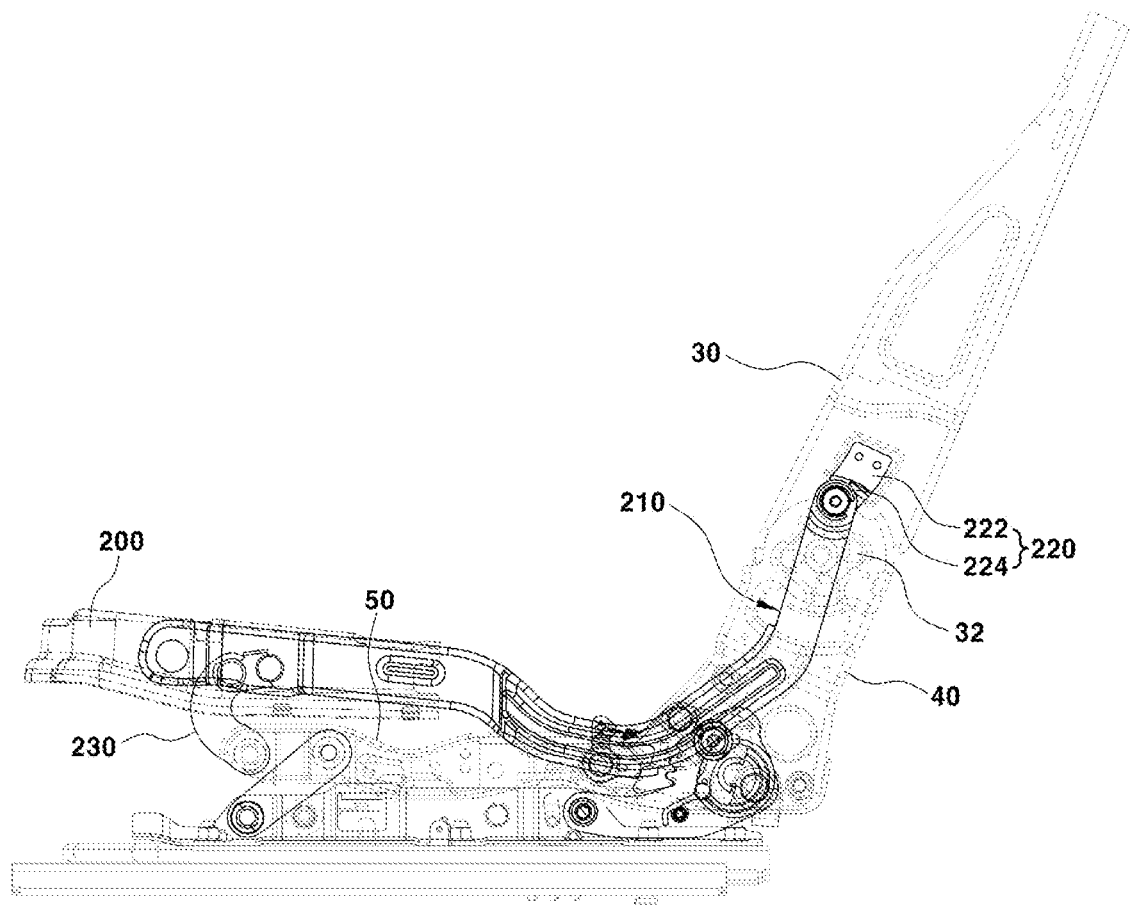
FIG. 9 is a side view illustrating a connecting structure of a dive link that is included in the device for adjusting the seat of the vehicle of the present disclosure.
Figure 10:
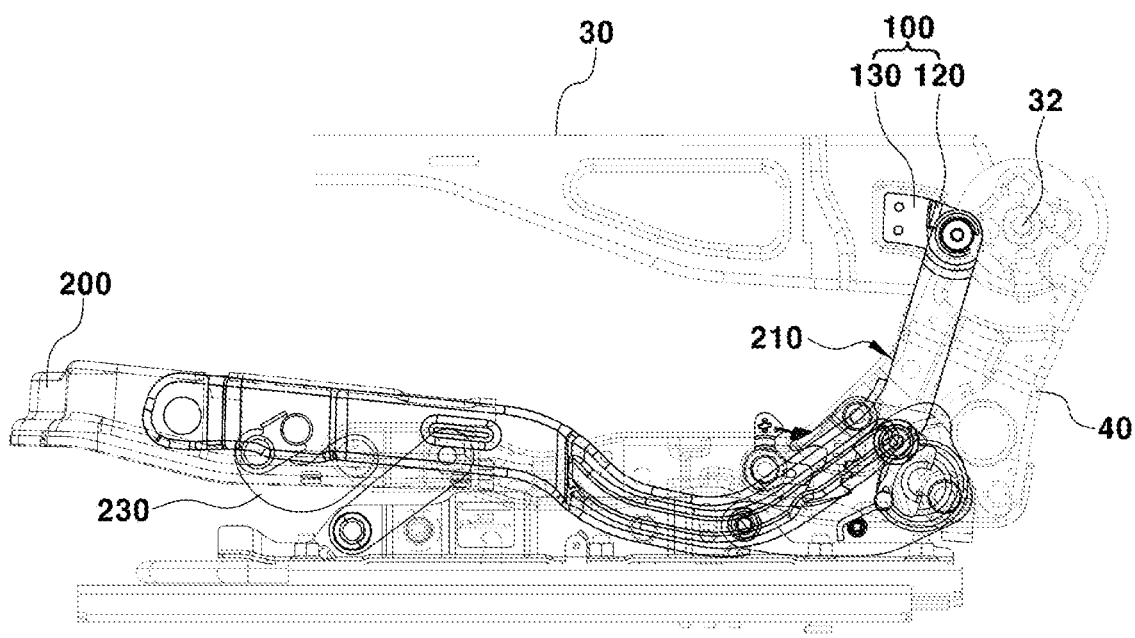
FIG. 10 is a side view illustrating a diving movement of a seat cushion when a seatback is folded by the dive link that is included in the device for adjusting the seat of the vehicle of the present disclosure.

FIG. 9 is a side view illustrating a connecting structure of a dive link that is included in the device for adjusting the seat of the vehicle of the present disclosure, and FIG. 10 is a side view illustrating a diving movement of the seat cushion when the seatback is folded by the dive link that is included in the device for adjusting the seat of the vehicle of the present disclosure.

Apart from the walk-in operation of the seat as described above, a fold-and-dive function in which a diving movement can be realized when the seatback is folded may be realized.

For reference, the fold-and-dive function is a function that enables a front end portion of the seat cushion to be positioned downward together with a folding operation of the seatback so as to secure a flat rear surface of the folded seatback such that an object is easily loaded on the seatback.

To this end, a dive link 210 formed in a hockey stick shape and for diving the front end portion of the seat cushion while folding the seatback may be connected between the seatback frame 30 and a seat cushion front end frame 200.

A front end portion of the dive link 210 may be horizontally arranged and is connected to the seat cushion front end frame 200, and a rear end portion of the dive link 210 may be bent upwardly and is hinge-fastened to the seatback frame 30.

At this time, a rotating bracket 220 to which the rear end portion of the dive link 210 is hinge-fastened may be mounted on a side surface of the seatback frame 30.

More specifically, the rotating bracket 220 may include a fixed plate 222 and a hinge connection plate 224. The fixed plate 222 is mounted on the seatback frame 30 so as to move a hinge-fastening point between the rotating bracket 220 and the dive link 210 to the forward direction when the seatback is folded and to push the dive link 210 to a direction for diving the seat cushion, and the hinge connection plate 224 extends and is bent downward perpendicularly to the fixed plate 222 and is hinge-fastened to a rear end portion of the dive link 210.

In addition, a dive supporting link 230 formed in an arc shape and supporting the dive link 210 may be hinge-fastened between the front end portion of the dive link and the front end portion of the seat cushion tilting frame 50.

In addition, when the seatback is folded above the seat cushion by using the recliner 32, which is when the seatback frame 30 is folded above the seat cushion with respect to the recliner 32, the rotating bracket 220 mounted on the side surface of the seatback frame 30 may be also rotated as illustrated in FIG. 10. Therefore, the hinge-fastening point between the rear end portion of the dive link 210 and the hinge connection plate 224 of the rotating bracket 220 is moved to the forward direction.

In addition, as the hinge-fastening point between the rear end portion of the dive link 210 and the hinge connection plate 224 of the rotating bracket 220 is moved to the forward direction, the dive link 210 may be pushed and moved to the forward direction, and the dive link 210 may push the seat cushion front end frame 200 downward, so that the diving operation of the seat cushion front end frame 200 is realized.

At this time, when the diving operation of the seat cushion front end frame 200 is performed, the dive supporting link 230 connected between the front end portion of the dive link 210 and the front end portion of the seat cushion tilting frame 50 may be rotated in a direction in which the dive supporting link 230 is laid.

In this manner, since the folding operation of the seatback frame 30 and the diving operation of the seat cushion front end frame 200 are easily performed by the dive link 210, the dive supporting link 230, and so on, the rear surface of the seatback may be easily become a flat surface for stably loading an object.

Although an embodiment of the present disclosure has been described in detail, the scope of the prevent disclosure is not limited to the embodiment, and various modifications and improvements devised by those skilled in the art using the fundamental concept of the present disclosure, which is defined by the appended claims, may further fall within the scope of the present disclosure.

What is claimed is:

1. A device for adjusting a seat of a vehicle, the device comprising:
    a movable rail fastened to a stationary rail and configured to be movable in a forward direction and a backward direction;
    a base frame mounted on the movable rail;
    a seat cushion tilting frame connected to a seatback frame;
    a rear link provided in a structure having a locking protrusion, and the rear link hinge-fastened between a rear end portion of the base frame and a rear end portion of the seat cushion tilting frame and configured to be rotatable in the forward direction and the backward direction;
    a rear spring mounted on the rear link and configured to exert an elastic restoration force that rotates the rear link in the forward direction;
    a locking device mounted on the seat cushion tilting frame and configured to lock the rear link such that the rear link maintains a horizontally arranged state or to unlock the rear link such that the rear link is rotated to the forward direction by the elastic restoration force of the rear spring and is lifted vertically; and
    a front link hinge-fastened between a front end portion of the base frame and a front end portion of the seat cushion tilting frame and configured to be rotatable in the forward direction and the backward direction.

2. The device of claim 1, wherein the locking protrusion is formed in a sector gear shape and is provided on an upper end of a front surface portion of the rear link.

3. The device of claim 2, wherein a slot for uniformly guiding a rotation path of the rear link is formed on a behind position of the locking protrusion on an upper end portion of the rear link.

4. The device of claim 3, wherein a guide pin inserted into the slot is protrudingly formed on the seat cushion tilting frame.

5. The device of claim 1, wherein the rear spring is a spiral spring which has an inner end portion fixed to a first spring fixing pin that is formed on an upper end center portion of the rear link and which has an outer end portion fixed to a second spring fixing pin that is formed on a middle portion of the rear link.

6. The device of claim 1, wherein the locking device comprises:
    a pawl provided in a structure having a locking groove to which the locking protrusion of the rear link is inserted, and the pawl rotatably fastened to the seat cushion tilting frame;
    a cam provided in a structure capable of being in contact with the pawl, and the cam rotatably fastened to the seat cushion tilting frame so as to rotate the pawl in a locking direction or an unlocking direction; and
    a cable connected to the cam so as to pull the cam in the unlocking direction.

7. The device of claim 6, wherein an upper end portion of the pawl is rotatably hinge-fastened to the seat cushion tilting frame, and the pawl is provided in a structure in which the locking groove is formed on a rear surface portion of the pawl, a pressing protrusion pressed by the cam is formed on a front surface of a lower end portion of the pawl, and a flipping end flipped by the cam is formed on the front surface of the upper end portion of the pawl.

8. The device of claim 7, wherein a lower end portion of the cam is rotatably hinge-fastened to the seat cushion tilting frame, and the cam is provided in a structure in which a cable connecting end is formed on an upper end portion of the cam, and an operation end in contact with the pressing protrusion so as to be capable of pressing the pressing protrusion of the pawl or in contact with the flipping end so as to be capable of flipping the flipping end of the pawl is protrudingly formed on a rear surface of the lower end portion of the cam.

9. The device of claim 6, wherein a cover body which is for protecting the rear link, the pawl, and the cam and which is for supporting the rear link, the pawl, and the cam to be rotatable is further mounted on the seat cushion tilting frame.

10. The device of claim 9, wherein a return spring for returning the cam to an original position of the cam after the cam is rotated is connected between the cover body and the upper end of the cam.

11. The device of claim 6, wherein an actuator driven to pull the cable when a switch is turned on is connected to the cable.

12. The device of claim 1, wherein a front spring configured to exert an elastic restoration force that rotates the front link to the forward direction is further mounted on the front link.

13. The device of claim 12, wherein the front spring is a spiral spring which has an inner end portion fixed to a third spring fixing pin that is formed on a lower end portion of the front link and which has an outer end portion fixed to a fourth spring fixing pin that is formed on an upper end portion of the front link.

14. The device of claim 1, wherein a bracket for unlocking the movable rail is mounted on an inner surface of the rear link.

15. The device of claim 14, wherein a linkage lever rotatably in contact with the bracket for unlocking the movable rail is mounted on a bar for unlocking the movable rail.

16. The device of claim 1, wherein a dive link formed in a hockey stick shape and for diving a front end portion of a seat cushion when a seatback is folded is connected between the seatback frame and a seat cushion front end frame.

17. The device of claim 15, wherein a rotating bracket for rotating a hinge-fastening point between the rotating bracket and a rear end portion of the dive link to the forward direction when the seatback frame is folded is mounted on a side surface portion of the seatback frame.

18. The device of claim 17, wherein the rotating bracket comprises:

a fixed plate mounted on the seatback frame and configured to move the hinge-fastening point between the rotating bracket and the dive link to the forward direction when the seatback is folded such that the dive link is pushed in a direction for performing a diving operation; and a hinge connection plate extending and perpendicularly bent downward from the fixed plate and to which the rear end portion of the dive link is hinge-fastened.

19. The device of claim 16, wherein a dive supporting link supporting the dive link is rotatably hinge-fastened between a front end portion of the dive link and the front end portion of the seat cushion tilting frame.

20. A vehicle comprising the device of claim 1.

* * * * *